United States Patent [19]

Luthra et al.

[11] Patent Number: 5,294,489
[45] Date of Patent: Mar. 15, 1994

[54] PROTECTIVE COATING WITH REACTIVE INTERLAYER ON REINFORCEMENT IN SILICON CARBIDE COMPOSITE

[75] Inventors: Krishan L. Luthra, Schenectady; Milivoj K. Brun; Gregory S. Corman, both of Ballston Lake, all of N.Y.

[73] Assignee: General Electric Company, Schenectady, N.Y.

[21] Appl. No.: 862,034

[22] Filed: Apr. 2, 1992

[51] Int. Cl.$^5$ ............................................. B32B 9/00
[52] U.S. Cl. ..................................... 428/379; 428/366; 428/367; 428/368; 428/378; 428/380; 428/384; 428/387; 428/408; 428/457; 428/469; 428/472; 428/698; 428/699; 428/701; 428/704
[58] Field of Search ............... 428/366, 367, 368, 378, 428/379, 380, 384, 386, 387, 389, 698, 408, 457, 469, 472, 699, 701, 704

[56] References Cited

U.S. PATENT DOCUMENTS

| | | | |
|---|---|---|---|
| 3,860,443 | 1/1975 | Lachman et al. | 117/106 |
| 3,925,577 | 12/1975 | Fatzer et al. | 428/446 |
| 4,145,471 | 3/1979 | Kendall et al. | 428/366 |
| 4,465,777 | 8/1984 | Chuford | 428/408 |
| 4,472,476 | 9/1984 | Velka et al. | 428/408 |
| 4,476,164 | 10/1984 | Velka et al. | 428/408 |
| 4,476,178 | 10/1984 | Velka et al. | 428/408 |
| 4,487,799 | 11/1984 | Galasso et al. | 428/408 |
| 4,500,602 | 2/1985 | Patten et al. | 428/698 |
| 4,515,860 | 5/1985 | Holzl | 428/469 |
| 4,642,271 | 2/1987 | Rice | 428/698 |
| 4,671,997 | 6/1987 | Galasso et al. | 428/698 |
| 4,795,677 | 1/1989 | Gray | 428/408 |
| 4,863,773 | 9/1989 | Rousseau et al. | 428/408 |
| 4,868,056 | 9/1989 | Haselkorn | 428/408 |
| 4,871,587 | 10/1989 | Levin | 427/249 |
| 4,889,686 | 12/1989 | Singh et al. | 419/13 |
| 4,944,904 | 7/1990 | Singh et al. | 269/60 |
| 4,981,822 | 1/1991 | Singh et al. | 501/95 |
| 5,015,540 | 5/1991 | Borom et al. | 428/698 |
| 5,021,367 | 6/1991 | Singh et al. | 501/88 |
| 5,026,604 | 6/1991 | Thebault | 428/367 |
| 5,043,303 | 8/1991 | Singh et al. | 501/90 |

FOREIGN PATENT DOCUMENTS 0290322 11/1988 European Pat. Off. .

OTHER PUBLICATIONS

Stife et al "Ceramic Coatings for Carbon Carbon Composites" Cer. Bull. vol. 62, No. 2, 1988, p. 369–374.
Sheehan "Oxidation Resistant Carbon Carbon Composites".

*Primary Examiner*—A. A. Turner
*Attorney, Agent, or Firm*—James Magee, Jr.

[57] ABSTRACT

A protective coating for a reinforcement phase exposed to molten silicon or silicon alloy infiltrant comprises, an inner layer material resistant to reaction with the molten infiltrant, an interlayer of a reactive material that reacts with the infiltrant to form compounds having a melting temperature greater than the infiltrant, and an outer layer material resistant to reaction with the molten infiltrant. Materials resistant to reaction with molten silicon are a metal carbide from the group consisting of carbides of titanium, hafnium, zirconium, and tantalum; a metal nitride from the group consisting of nitrides of boron, silicon, aluminum, titanium, zirconium, hafnium, niobium, and tantalum; a metal boride from the group consisting of borides of titanium, zirconium, hafnium, silicon, and aluminum, or combinations thereof. Another inner layer material resistant to reaction with molten silicon is a metal oxide that is an oxide of aluminum, yttrium, titanium, zirconium, hafnium, beryllium, silicon, lanthanum, scandium, or the rare earths. Another outer layer material is rhodium, iridium, metal that reacts with silicon to form a silicide, metal carbide, metal silicide, metal nitride, or metal boride. Suitable metal silicides are silicides of chromium, molybdenum, tantalum, titanium, tungsten, or zirconium. Materials reactive with the molten silicon are carbon, molybdenum, titanium, chromium, niobium, zirconium, iridium, and combinations thereof.

9 Claims, 1 Drawing Sheet

PROTECTIVE COATING WITH REACTIVE INTERLAYER ON REINFORCEMENT IN SILICON CARBIDE COMPOSITE

This application is related to copending applications Ser. No. 07/056,516, filed Jun. 1, 1987, now U.S. Pat. No. 5,101,540 Ser. No. 07/001,806, filed Sept. 24, 1987 now U.S. Pat. No. 4,766,297, Ser. No. 07/716,444, filed Jun. 17, 1991, pending Ser. No. 07/716,442, filed Jun. 17, 1991 pending, Ser. No. 07/716,443, filed Jun. 17, 1991 pending, and Ser. No. 07/714,417, filed Jun. 12, 1991 now abandoned.

BACKGROUND OF THE INVENTION

This invention relates to a molten silicon infiltration formed silicon carbide composite and a method for forming the composite, and more specifically to a protective coating having a reactive interlayer on a reinforcement phase in the composite.

High temperature fiber reinforced composites have great potential for use in aircraft and gas turbines due to the high strength to weight ratio of such materials. Composites of carbon fiber reinforced carbon matrices have been used in aircraft construction, but poor oxidation resistance has limited use to low temperature applications of 1000° C. or less. High strength carbon fibers have been infiltrated with molten silicon to provide a silicon matrix for protecting the carbon fiber reinforcements. However, the silicon infiltration converts the carbon fiber reinforcements into relatively weak, irregular columns of silicon carbide crystals resulting in composites with low toughness and relatively modest strength.

As an alternative approach, attempts have been made to incorporate silicon carbide fibers in a silicon matrix by the process of silicon infiltration. Unfortunately, silicon carbide has a limited solubility in molten silicon, and leads to transport and recrystallization of silicon carbide causing the silicon carbide fibers to loose substantial strength. Also, silicon carbide forms a strong bond with silicon so the fiber bonds to the matrix resulting in brittle fracture of the composite. In ceramic composites, a relatively weak bond at the fiber-matrix interface is preferred in order to achieve improved fracture toughness. Toughness is improved in fiber reinforced ceramic composites when the fiber reinforcement does not chemically bond with the surrounding matrix, so that force applied to the matrix is transferred from the matrix to the fiber substantially by friction.

U.S. Pat. Nos. 4,889,686; 4,944,904; 4,981,822; 5,015,540; 5,021,367; and 5,043,303, incorporated herein by reference, disclose a molten silicon infiltration formed silicon carbide composite having boron nitride coated reinforcement fibers and the method of formation. Briefly described, an assembly is formed of a fiber reinforced carbonaceous preform and means for contacting the preform with infiltrant, either by placing infiltrant directly on the preform or placing the preform and a deposit of infiltrant on a wicking material such as carbon cloth. The assembly is heated to the infiltration temperature, about 1410° to 1550° C. where the silicon or silicon alloy infiltrant is molten. The infiltrant reacts with the carbonaceous preform to form a composite having a matrix of silicon carbide.

The boron nitride coating helps protect the carbon or silicon carbide reinforcement fibers from reacting with the molten infiltrant. The coated reinforcement fibers can have an outer layer on the inner boron nitride layer, the second layer being a silicon-wettable material such as elemental carbon, metal carbide, a metal which reacts with silicon to form a silicide, metal nitride such as silicon nitride, and metal silicide. The metal carbide can be a carbide of silicon, tantalum, titanium, or tungsten. The metal silicide can be a silicide of chromium, molybdenum, tantalum, titanium, tungsten, and zirconium. The metals which react with silicon are chromium, molybdenum, tantalum, titanium, and tungsten.

Although the protective coatings described above have provided a significant improvement in silicon carbide composites, we have found that such coatings can provide variable performance in improving the strength and toughness of the composites. It is believed variations in coating thickness, coating imperfections such as porosity or pinholes, and consumption of some of the coating by the molten silicon infiltrant are some of the factors that can lead to reaction between the molten silicon infiltrant and localized areas of the reinforcement fibers despite the presence of the coating. For example, batches of several thousand fibers in arrayed stacks can be coated in a chemical vapor deposition coating apparatus, but coating variations along the fiber length or between fibers in the stacked arrays can be found. Reaction between the silicon infiltrant and the fiber, even in localized areas, can result in reduced strength and toughness in the composite, for example by degradation of the fiber strength or the formation of chemical bonds between the reinforcement fibers and the matrix.

One aspect of this invention is to provide molten silicon infiltration formed silicon carbide composites having an improved coating on a reinforcement from a reactive interlayer in the coating.

Another aspect of this invention is to provide a method of forming molten silicon infiltration formed silicon carbide composites having improved protective coatings on the reinforcement phase from a reactive interlayer in the coating.

Another aspect of this invention is to provide an improved protective coating having a reactive interlayer for the reinforcement phase in molten silicon infiltration formed silicon carbide composites.

BRIEF DESCRIPTION OF THE INVENTION

A protective coating for a reinforcement phase exposed to molten silicon or silicon alloy infiltrant comprises, an inner layer material resistant to reaction with molten silicon, an interlayer of a reactive material that reacts with the infiltrant to form compounds having a melting temperature greater than the infiltrant, and an outer layer material resistant to reaction with molten silicon.

As used herein, the term "infiltrant" means silicon, or a silicon alloy comprised of up to about 20 atomic percent of an element or elements having a finite solubility in molten silicon, and the balance substantially silicon. For example, some of the elements having a finite solubility in molten silicon are boron, molybdenum, tungsten, chromium, titanium, zirconium, hafnium, aluminum, niobium, and tantalum.

Suitable inner and outer layer materials resistant to reaction with the molten infiltrant are metal carbides including carbides of titanium, hafnium, zirconium, and tantalum; metal nitrides including nitrides of boron, silicon, aluminum, titanium, zirconium, hafnium, niobium, and tantalum; and metal borides including borides of titanium, zirconium, hafnium, silicon, and aluminum; or combinations thereof.

Another inner layer material resistant to reaction with molten silicon is a metal oxide that is an oxide of aluminum, yttrium, titanium, zirconium, hafnium, beryllium, silicon, lanthanum, scandium, and the rare earths. Other outer layer materials resistant to reaction with molten silicon are rhodium, iridium, metal carbide, metal silicide, metal nitride, or metal boride. Suitable metal silicides are silicides of chromium, molybdenum, tantalum, titanium, tungsten, or zirconium.

Reactive materials that react with the molten infiltrant to form compounds having a melting temperature greater than the infiltrant are carbon, molybdenum, titanium, chromium, niobium, zirconium, iridium, or combinations thereof. Preferably, the reactive layer does not react with the inner or outer layer material, and for most inner and outer layer materials carbon is non-reactive. Those skilled in the art can determine the other reactive materials that are compatible, i.e., non-reactive with the inner and outer layer materials.

A composite is comprised of a reinforcement phase having a protective coating of the material resistant to reaction with molten silicon, the coating being formed with an interlayer of a reactive material that reacts with the molten infiltrant to form compounds having a melting temperature greater than the infiltrant, and a matrix of molten silicon infiltration formed silicon carbide.

A method for forming the composite comprises, depositing a coating of the material resistant to reaction with molten silicon on a reinforcement phase, the coating being formed with a reactive interlayer. The coated reinforcement phase is formed with a carbonaceous material into a porous preform, and the preform is infiltrated in an inert atmosphere or partial vacuum with molten infiltrant to form the composite.

As used herein, the term "reinforcement phase" includes fibers, filaments, whiskers, tows, and cloth. The reinforcement phase can be formed from carbon or silicon carbide. As used herein, the term "matrix substantially of molten silicon infiltration formed silicon carbide" means the matrix is at least bonded by the silicon carbide formed by the reaction bonding of silicon and carbon, however, other materials or infiltration reaction products may be present in amounts that do not substantially reduce the strength, and toughness of the composite. For example, residual infiltrant may be present up to 50 volume percent, carbon may be present up to 20 volume percent, and metal silicides such as silicides of boron, molybdenum, titanium or tungsten, may be present up to about 30 volume percent of the composite.

DETAILED DESCRIPTION OF THE INVENTION

Figure 1:
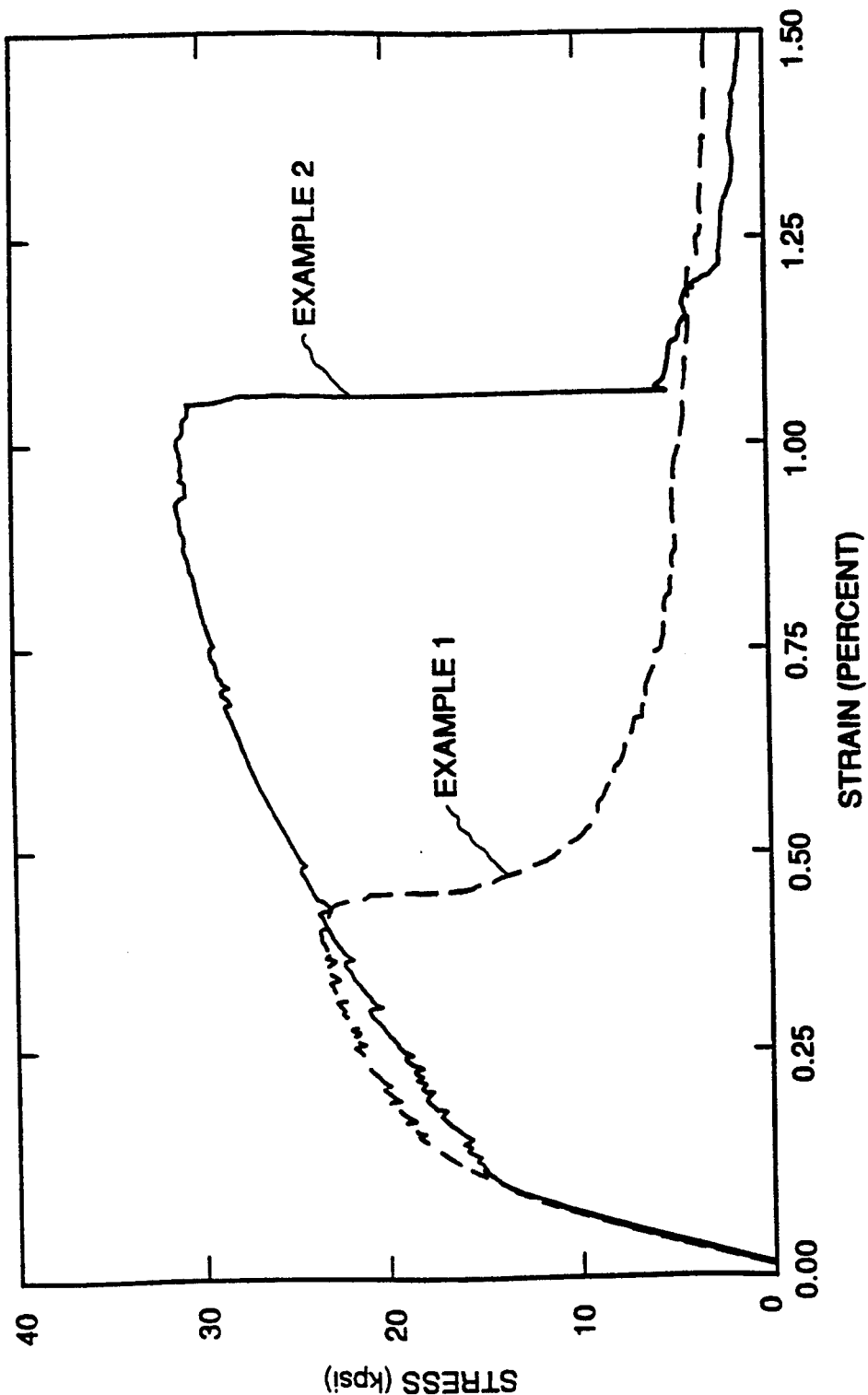
FIG. 1 is a graph showing the stress versus strain relationship for reinforced silicon carbide composite tensile specimens.

We have found that protective coatings that are resistant to molten silicon or silicon alloy infiltrant can contain imperfections such as porosity, pinholes, or thickness variations which permit localized reactions between the infiltrant and the reinforcement phase. We have discovered that by forming an interlayer in the coating of a material that reacts with the infiltrant, silicon diffusing or migrating through imperfections in the coating reacts with the interlayer, and forms silicon carbide so that further diffusion or migration through the protective coating is choked off. It is believed in the infiltration environment, both molten and vapor phase silicon can be present so that very fine imperfections in the protective coating can be penetrated by the infiltrant. An improved coating is formed on the reinforcement phase having a higher tolerance for coating imperfections. As a result, the improved coating minimizes interaction between silicon and the reinforcement phase to provide improved strength and toughness in the composite.

Reference herein to a fiber of silicon carbide includes known single crystal or polycrystalline fibers, fibers formed from organic precursors to produce silicon carbide containing fibers which may introduce a wide variety of elements into the fibers such as oxygen or nitrogen, or wherein silicon carbide envelops a core, and which generally are produced by chemical vapor deposition of silicon carbide on a core such as, for example, elemental carbon or tungsten. Examples of known silicon carbide fibers are Nicalon silicon carbide fibers, Nippon Carbon, Japan, HPZ and MPDZ silicon carbide fibers, Dow Corning, and fibers having the trade name SCS-6, or SCS-0 produced by Textron, Mass. Additional information about silicon carbide fibers can be found in "Boron and Silicon Carbide Fibers," T. Schoenberg, ENGINEERED MATERIALS HANDBOOK Volume 1 COMPOSITES, ASM International, 1987, pp 58–59, incorporated herein by reference.

Reference herein to fibers of carbon include amorphous, single crystalline or polycrystalline carbon fibers such as derived from the pyrolysis of rayon, polyacrylonitrile or pitch. Preferably, the fibers have at room temperature, i.e. about 22° C., in air a minimum tensile strength of about 100,000 psi and a minimum tensile modules of about 25 million psi. Additional information about carbon fibers can be found in, "CARBON FIBERS," J. B. Donnet, O. P. Dahl, ENCYCLOPEDIA OF PHYSICAL SCIENCE AND TECHNOLOGY, Vol. 2, 1987, pp. 515–527, incorporated herein by reference.

The reinforcement phase is formed from fibers of carbon or silicon carbide, and can be continuous fibers or filaments, or discontinuous fibers which frequently have an aspect ratio of about 10 to 1000. A suitable reinforcement phase can be formed from continuous fibers wound to form a cylindrical tube, or formed into sheets by placing long lengths of fiber next to and parallel to one another. Such sheets can consist of single or multiple layers of filaments. Continuous filaments can also be woven, braided, or otherwise arrayed into desired configurations.

The inner layer material is formed on the reinforcement phase, the interlayer is formed on the inner layer, and the outer layer material is formed on the interlayer by deposition methods well known in the art that deposit a continuous coating while minimizing damage to the reinforcement phase. Coating processes such as chemical vapor deposition, or physical vapor deposition processes such as sputtering are suitable. Carbon can be deposited by known methods, for example, in the form of pyrolytic carbon. A continuous coating is deposited covering the entire surface of the reinforcement phase, the ends of the fiber may be exposed but such exposure is not considered significant. Preferably, the coating is uniform and smooth to minimize mechanical interlocking between the coating and matrix.

For example, the metal carbide or metal silicide coating can be directly deposited from the vapor thereof. Alternatively, the metal carbide coating can be formed in situ by initially depositing carbon followed by depositing metal thereon under conditions which form the metal carbide. If desired, a metal silicide coating can be produced by initially depositing the metal followed by deposition of silicon under conditions which form the metal silicide. Additional information about such coating processes can be found, for example, in "Metallic & Ceramic Coatings: Production, High Temperature Properties & Applications," M. G. Hocking, V. Vasantasree, P. S. Sidky, Longman Scientific & Technical, Essex England, 1989, incorporated herein by reference.

Preferably, the inner layer, interlayer, and outer layer are formed to be continuous and free of significant porosity. The thickness of the inner and outer layers can range from about 0.1 micron to about 6 microns, preferably, about 2 microns for fibers about 100 to 200 microns in diameter. The thickness of the interlayer can range from about 0.02 micron to about 2 microns, preferably, about 0.1 microns. The particular thickness of the layers is determinable empirically, i.e., the combined layers should be sufficient to prevent reaction, or prevent significant reaction, between the fibers and the molten infiltrant under the particular processing conditions used. During the infiltration process, the inner or outer layer can react with or dissolve in the molten infiltrant depending on time and temperature, i.e., the coating will survive better at lower temperatures and for shorter times of infiltration. Generally, the infiltration time increases with the size of the preform. Therefore, larger-sized preforms may require thicker coatings on the fibers.

The protective coating, more specifically the outer layer, can be coated with additional layers of materials that are resistant to reaction with the infiltrant, or promote wetting of the infiltrant to the coating on the reinforcement. For example, additional layers of carbon, metal that reacts with silicon to form a silicide such as chromium, molybdenum, tantalum, titanium and tungsten; metal carbide such as a carbide of silicon, tantalum, titanium or tungsten; metal silicide such as a silicide of chromium, molybdenum, tantalum, titanium, tungsten or zirconium; metal nitride such as a nitride of silicon, aluminum, titanium, zirconium, hafnium, niobium, tantalum, or boron; and metal diboride such as a diboride of titanium, zirconium, hafnium, or aluminum can be formed on the protective coating. The thickness of the additional layers can range from about 200 angstroms to about 3 microns, preferably, about 0.5 to 2 microns.

The reinforcement phase is mixed with a carbonaceous material to form a porous preform. The porous carbonaceous preform can be formed from the carbonaceous material by known and conventional ceramic powder forming techniques that provide a homogenous distribution of the desired porosity and carbonaceous material in the preform, and minimize damage to the coating on the reinforcement. Suitable methods of forming the carbonaceous material into the preforms are disclosed, for example, in U.S. Pat. Nos. 4,889,686, 4,944,904, 4,981,822, 5,015,540, 5,021,367, and 5,043,303, all incorporated herein by reference.

The porous carbonaceous preform has a porosity that can be determined empirically, or by means well known in the art for determining the packing density of the powder and fiber in the carbonaceous material used to form the preform. In addition, silicon powder can be used as a porosity component in forming the preform since any silicon in the preform will become molten at the infiltration temperature and become part of the infiltrant.

The porous carbonaceous preform has an open porosity ranging from about 25% by volume to about 90% by volume of the preform, and the particular amount of such open porosity depends largely on the particular composite desired. Preferably, the preform has an open porosity ranging from about 30% to about 50% by volume to minimize cracking, swelling, or retained porosity in the final infiltrated silicon carbide body. In preforms having less than about 30 volume percent porosity, premature reaction-choking can occur preventing complete infiltration of the preform. As preform porosity increases above about 50 percent the preform is made weaker, increasing the propensity for cracking or swelling during infiltration.

By open porosity of the preform, it is meant herein pores, voids or channels which are open to the surface of the preform thereby making the interior surfaces accessible to the ambient atmosphere or the infiltrant. Preferably, the preform has no closed porosity. By closed porosity it is meant herein closed pores or voids, i.e. pores not open to the surface of the preform and therefore not in contact with the ambient atmosphere. Preferably, the pores in the preform are small, ranging from about 0.1 micron to about 50 microns, and are distributed uniformly through the preform thereby enabling the production of a composite wherein the matrix phase is uniformly distributed through the composite.

The carbonaceous material is at least comprised of carbon, and may include a reactive metal component or a ceramic component. The carbonaceous material can be in the form of a carbon vapor infiltration formed coating, powder particles, or fibers. Preferably, fibers in the carbonaceous material have an aspect ratio of about 5 to 50, and a diameter of about 0.5 to 25 microns. Preferably, powder particles in the carbonaceous material have an average particle size of less than 50 microns, more preferably about 0.5 to 25 microns.

The composition of the carbonaceous material is determinable empirically and depends on the particular silicon carbide composite desired, i.e. the particular properties desired in the silicon carbide composite. However, the carbonaceous material is at least comprised of an amount of carbon that can react with the infiltrant, and bond the matrix of the composite with silicon carbide formed in situ. Carbon can range from about 5% by volume, or from 10% or 20% by volume, to about 100% by volume, of the carbonaceous material. The carbonaceous material as well as any reaction product thereof produced in the infiltration process should not flow to any significant extent and preferably is solid in the infiltration process.

As used herein, the term carbon includes amorphous, single crystal, or polycrystalline carbon, graphite, carbonized plant fibers, lamp black, finely divided coal, charcoal, and carbonized binders such as epoxy, plasticizers, polymer fibers or felt such as rayon, polyacrylonitrile, and polyacetylene.

Carbon powder serves as a source of carbon to react with the infiltrant and form silicon carbide, and as a binder to maintain the shape and integrity of the preform. The carbon powder particles can have a density of about 1.2 to 2.2 grams per milliliter. Preferably, the carbon powder particles are a low density amorphous carbon having a density of about 1.2 to 1.95 grams per milliliter. A suitable carbon powder is a Dylon aqueous graphite powder suspension, Dylon Industries, Inc., Ohio. Other sources for carbon powder are Johnson Matthey, Mass., and Great Lakes Carbon, N.Y. The amount and type of carbonaceous material depends largely on the particular composite desired and is determinable empirically.

Preferably, the carbonaceous material and resulting preform contain some fibrous carbon in the form of chopped fibers or whiskers. The whiskers promote infiltration by wicking molten silicon into the preform and are a source of carbon for reacting with the infiltrant to form silicon carbide. Long whisker lengths are desirable to achieve good wicking, while short whisker lengths result in better packing and less porosity to fill in the preform. The whiskers also provide strength to the preform. Chopped fibers or whiskers can be described by the aspect ratio of the fiber, i.e. fiber length to diameter. The whiskers have a density of about 1.2 to 2.2 grams per milliliter, preferably, about 1.2 to 1.6 grams per milliliter. Low density furnace insulation type WDF carbon felt, available from Union Carbide, can be crushed and abraded against a wire mesh screen, for example about 40 mesh, to form suitable whiskers. Low density carbon fiber can be formed by carbonizing naturally occurring cellulose fibers, including cotton, chitosan, and bamboo, and chopped or crushed to form the whiskers.

The carbonaceous material also may include up to about 25 volume percent of a reactive metal which reacts with elemental silicon to form a silicide. Reactive metals include molybdenum, chromium, tantalum, titanium, tungsten and zirconium. Uniform distribution of the reactive metal in select amounts can minimize the elemental silicon remaining in the composite. Additional information about carbonaceous materials comprised of reactive metals to minimize elemental silicon in the composite can be found in copending application Ser. No. 07/709,051, filed Jun. 3, 1991, now abandoned, incorporated herein by reference.

The carbonaceous material may also include a ceramic material, in an amount up to about 50 percent by volume of the carbonaceous material. The ceramic material may or may not react with silicon, and is a ceramic such as a ceramic carbide, a ceramic oxide, a ceramic nitride or a ceramic silicide. The ceramic can be selected to provide additional control of the swelling, the rate of the exothermic reactions occurring during infiltration, conductivity, thermal expansion, elastic modulus, or to reduce density in the composite. A suitable ceramic material is a ceramic carbide such as boron carbide, molybdenum carbide, niobium carbide, silicon carbide and titanium carbide; a ceramic nitride such as boron nitride, aluminum nitride, niobium nitride, and silicon nitride, titanium nitride and zirconium nitride; a ceramic oxide such as zirconia, alumina, yttria, silica, and mullite; or a ceramic silicide such as chromium silicide, molybdenum silicide, tantalum silicide, titanium silicide, tungsten silicide, and zirconium silicide. The ceramic material can be a powder or fiber, preferably comparable in size to the other carbonaceous materials described above. However, the ceramic material can be continuous fiber lengths, e.g., continuous lengths of reinforcement fibers such as high strength silicon carbide or carbon fibers.

The carbonaceous material is mixed with the coated reinforcement in a manner that minimizes damage to the coating. The carbonaceous material can be formed into a molding composition, for example disclosed in U.S. Pat. No. 4,320,079, incorporated herein by reference. Briefly described, the carbonaceous material can be mixed in a curable binder, e.g., epoxy resin such as Epon 828, a product of Shell Chemical Co., with a hardener for the epoxy.

A water based slurry molding composition can be formed from a mixture comprised of about 1 to 10 volume percent of a nonionic polyethylene oxide homopolymer ranging in weight average molecular weight from about 100,000 to 5,000,000, up to about 50 volume percent furfural alcohol or tetrahydrofurfural alcohol, about 30 to 80 volume percent of the carbonaceous material, and the balance water. A suitable ethylene oxide polymer is Polyox WSR-205 or WSR Coagulant, Union Carbide. The ethylene oxide polymer thickens the mixture and maintains the homogeneity in the mixture of carbonaceous material, so, for example, the higher density reactive powder does not separate out. The furfural alcohol or tetrahydrofurfural alcohol adds strength and plasticity to the preform to improve tape laminating and machining properties.

The molding composition and coated fibers can be formed by conventional techniques to form the porous preform having a reinforcement phase. For example, the coated reinforcement can be positioned in a mold in a desired configuration, and the molding composition can be cast, injection molded, or slip cast to produce the preform of desired size and shape. Reinforced preform tapes can be formed by conventional tape casting techniques such as the doctor blade method, and the tapes can be pressed to form laminated preforms. Any lubricants, binders, plasticizers, dispersant, or similar materials used in forming the molding composition or shaping the preform are the type which decompose on heating at temperatures below the infiltration temperature, preferably below 500° C., without leaving a residue that degrades the infiltration of the preform. It should be understood a suitable binder for the molding composition may leave a porous carbon deposit that does not degrade the infiltration of the preform.

In a more specific example, a fiber reinforced tape preform is formed by aligning continuous fibers, coated with the protective coating, to be parallel in the length dimension of the tape. The water based slurry molding composition is cast to envelop the fibers and spread to form the fiber reinforced tape. Liquid is allowed to evaporate in air, and the tape is heated to about 300° C. in air to decompose the binder. Additional strength is provided to the preform by infiltrating furfural alcohol, or tetrahydrofurfural alcohol, for example, 931 graphite adhesive binder, Cotronics, New York into the preform. Alternatively, the furfural alcohol or tetrahydrofurfural alcohol is mixed into the molding composition prior to casting in amounts up to about 50 volume percent of the molding composition. The tape preform is dried in air, and heated to 100° C. to strengthen the preform. The tapes can be laminated by pressing at about 30 to 1000 psi. The tapes are heated to 300° C. in air to decompose the binder, and form the porous preform. Additional information about tape casting with the water based slurry molding composition can be found in cofiled application RD-21,823, incorporated herein by reference.

The preform is contacted with an infiltrating means whereby silicon is infiltrated into the preform to form a molten silicon infiltration formed silicon carbide matrix. The infiltrating means allow silicon to be infiltrated into the preform. For example, a structure or assembly is formed comprised of the preform in contact with means that are in contact with silicon and which permit infiltration of molten silicon into the preform. In one infiltration technique, the preform is placed on a woven cloth of elemental carbon, a piece of silicon is also placed on the cloth, and the resulting structure is heated to the infiltration temperature. At the infiltration temperature, the molten silicon migrates along the cloth and wicks into the preform. After infiltration, the wicking carbon cloth may be removed from the composite by diamond grinding.

In another technique, the silicon infiltration procedure can be carried out as set forth in U.S. Pat. No. 4,626,516, incorporated herein by reference, which discloses an assembly that includes a mold with infiltration holes and a reservoir holding elemental silicon. The preform is placed within the mold and carbon wicks are provided in the infiltrating holes. The wicks are in contact with the preform and also with the silicon and at infiltration temperature the molten silicon migrates along the wicks into the preform.

U.S. Pat. No. 4,737,328 incorporated herein by reference, discloses another infiltration technique which comprises contacting the preform with a powder mixture composed of silicon and hexagonal boron nitride, heating the resulting structure to a temperature at which the silicon is fluid and infiltrating the fluid silicon into the preform. After infiltration, the resulting porous hexagonal boron nitride powder is brushed off the composite.

Preforms having a simple square or rectangular shape can be infiltrated by placing silicon directly on the preform, and heating to a temperature at which the silicon is fluid. The molten silicon wicks into and infiltrates the preform.

The preform and infiltration structure or assembly are heated to the infiltration temperature in an inert atmosphere or partial vacuum. Suitable inert atmospheres include argon, or reducing atmospheres such as hydrogen or carbon monoxide. Atmospheres that react with molten silicon, such as oxygen or nitrogen, are avoided. The remaining atmosphere of the partial vacuum should be inert, such as argon, or reducing such as carbon monoxide. Preferably, the partial vacuum is provided before heating is initiated. The partial vacuum is at least sufficient to avoid the entrapment of pockets of gas, and minimizes porosity in the infiltration formed composite. Generally, such a partial vacuum ranges from about 0.01 torr to about 2 torr, and usually from about 0.01 torr to about 1 torr to remove gas evolving in the preform being infiltrated.

Preferably, the furnace used is a carbon furnace, i.e., a furnace constructed essentially from elemental carbon. Such a furnace reacts with oxygen in the furnace atmosphere to produce CO or $CO_2$ and thereby provides a nonoxidizing atmosphere so that reaction between the residual gas, preform, and infiltrant is minimized. Infiltration cannot be carried out in air because the liquid silicon would oxidize to form a dense silica coating before any significant infusion by silicon occurred. When a carbon furnace is not used, it is preferable to have a material that reacts with oxygen, such as elemental carbon, present in the furnace chamber in order to provide a nonoxidizing atmosphere. Alternatively, other nonoxidizing atmospheres inert to the infiltration process can be used at partial vacuums of about $10^{-2}$ torr to 2 torr.

Infiltration is performed at a temperature where the infiltrant is molten, but below the temperature where the infiltrant begins to damage the reinforcement phase or coating on the reinforcement phase. The melting point of the infiltrant can vary depending largely on the particular elements which may be present in the silicon alloy. The infiltration temperature ranges from about 1400° C. to about 1600° C., and preferably from about 1425° C. to about 1450° C. The rate of penetration of the infiltrant into the preform depends on the wetting of the preform by the infiltrant, and the fluidity of the molten infiltrant. As the infiltration temperature increases, the ability of the molten infiltrant to wet the preform improves.

Sufficient infiltrant is infiltrated into the preform to react with the preform and produce the infiltration formed silicon carbide matrix. Specifically, the molten infiltrant is mobile and highly reactive with elemental carbon, i.e. it has an affinity for elemental carbon, wetting it and reacting with it to form silicon carbide. The molten infiltrant also has an affinity for the metals with which it reacts to form silicides. In addition, sufficient infiltrant is infiltrated into the preform to fill pores or voids which may remain in the composite.

The period of time required for infiltration by the silicon is determinable empirically and depends largely on the size of the preform and extent of infiltration required. Generally, it is completed in less than about 20 minutes, and often in less than about 10 minutes. The resulting infiltrated body is cooled in an atmosphere and at a rate which minimizes oxidation, cracking, or other defect formation within the body. Preferably, it is furnace cooled in the inert atmosphere or partial vacuum to about room temperature, and the resulting composite is recovered.

The infiltration formed composite has a porosity of less than about 20% by volume, preferably less than about 10% or 5% by volume, and more preferably less than about 1% by volume, of the composite. Most preferably, the composite is void or pore-free or has no significant or no detectable porosity. Preferably, any voids or pores in the composite are small, preferably less than about 50 microns or less than about 10 microns, and are substantially uniformly distributed in the composite to minimize degradation of the mechanical properties of the composite.

The composite of this invention is comprised of a coated reinforcement phase and a molten silicon infiltration formed silicon carbide matrix. The matrix is distributed through the coated reinforcement phase so that the matrix is space filling and interconnecting. Preferably, the coated reinforcement phase is totally enveloped by the matrix. The reinforcement phase comprises about 5 to 75 volume percent of the composite. The matrix contains a silicon carbide phase formed in situ in an amount of about 5 to 90 volume percent, preferably about 45 to 75 volume percent of the composite. The matrix may contain residual infiltrant in an amount up to about 50 volume percent of the composite. The silicon carbide phase is distributed throughout the composite, and preferably, it is distributed uniformly.

The infiltration formed matrix may contain a phase of a metal silicide of molybdenum, chromium, tantalum, titanium, tungsten, or zirconium up to about 30 percent by volume of the composite. The metal silicide is distributed throughout the composite, and preferably, it is distributed uniformly. The infiltration formed matrix may contain a phase of a metal which forms a silicide but which had not reacted with the infiltrating silicon. In such instance, it would be encapsulated by the metal silicide phase. Such metal phase can range up to about 5% by volume, of the composite. The metal is distributed throughout the composite, and preferably, it is distributed uniformly.

The composite may contain a phase of a ceramic material from the group of ceramic carbide, ceramic nitride, or ceramic silicide discussed above. The ceramic material may comprise up to about 50% by volume, or from about 1% by volume to about 30% by volume, of the composite. The ceramic material is distributed throughout the composite, and preferably, it is distributed uniformly.

The infiltration formed silicon carbide matrix of the composite may contain a phase of carbon. For example, graphite is a less reactive type of carbon, which may not completely react with the infiltrating silicon. In such instance, the carbon is encapsulated by a phase of silicon carbide formed in situ. Carbon can range up to about 20% by volume of the composite. The carbon is distributed throughout the composite, and preferably, it is distributed uniformly.

The composite is at least bonded by silicon carbide formed in situ. It may also be bonded by a metal silicide which formed in situ. It may also be bonded by elemental silicon or a bond formed in situ between silicon and a ceramic material.

The coating on the reinforcement phase in the composite, i.e., the combined thickness of the inner layer, outer layer, and interlayer can range from a detectable amount to about 14 microns, preferably from about 0.5 microns to about 6 microns.

The reinforcement phase can range from about 5 to about 75 volume percent of the composite. The coated reinforcement phase is distributed throughout the composite, and most often, it is distributed uniformly throughout the composite. However, in some cases it is desirable to have higher packing fractions of the coated reinforcement phase in regions of the composite where higher local strength or stiffness may be desired. For example, in a structure having a long thin part, such as a valve stem, it is advantageous to strengthen the stem by increasing the volume fraction of the coated reinforcement phase in the stem region of the structure.

The coated reinforcement phase in the composite imparts significant toughness to the composite. Specifically, the coated reinforcement phase minimizes brittle fracture of the composite at room temperature, i.e. 25° C. By brittle fracture of a composite it is meant herein that the entire composite cracks apart at the plane of fracture. In contrast to a brittle fracture, the composite exhibits fiber pull-out on fracture at room temperature because the reinforcement phase coating provides a desirable debonding of the reinforcement phase from the matrix. Specifically, as the composite cracks open, generally at least about 10% by volume, frequently at least about 50% by volume and preferably all of the coated reinforcement phase does not break at the plane of fracture, but instead pulls out of the matrix. In this way, a stress transmitted through the composite by a crack in the matrix is distributed along the length of fibers in the path of the crack. Distribution of stress along the length of the fibers greatly diminishes the stress at the crack tip and reduces propagation of the crack through the matrix.

One particular advantage of this invention is that the composite can be produced directly in a wide range of sizes and shapes. For example, the composite can be as short as about an inch or less, or as long as desired. It can be of simple, complex, or hollow geometry. For example, it can be produced in the form of a tube or a hollow cylinder, a ring, a sphere, or a bar having a sharp point at one end. Since the composite can be produced in a predetermined configuration of predetermined dimensions, it requires little or no machining.

The composite has a wide range of applications depending largely on its particular composition. It can be used, for example, as a wear resistant part, bearing or tool insert, acoustical part, or high-temperature structural component.

Additional features and advantages of the method of this invention are shown in the following examples where, unless otherwise stated, the following materials and equipment were used. The carbon fiber was WDF carbon felt about 1.45 g/ml in density obtained from Union Carbide, and abraded against a wire mesh screen to form fibers having an average aspect ratio of about 10:1 and an average fiber diameter of about 7 microns. The silicon carbide powder, Lonza UF-5, had an average particle size of about 5 micrometers, Lonza Inc., New Jersey. The epoxy resin was Epon 828, Shell Chemical Co., Texas; the hardener for the epoxy was Methylene Dianiline, Aldridge Chemical Co,. Wisconsin; the binder was a polyvinyl butyral resin, Butvar-76, Monsanto, Missouri; the MIBK solvent was methylisobutylketone; the DIDG plasticizer was diisodecyl glutarate, C. P. Hall Co.; and the PVO plasticizer was, Plasticizer 2072, PVO International, New Jersey.

The silicon carbide fibers were about 145 microns in diameter, trade name SCS-6, obtained from Textron, Massachusetts. The silicon carbide fibers were produced by chemical vapor deposition of silicon carbide on a carbon core. The outside surface of the fibers consists of two layers of pyrolytic carbon and carbon-silicon having a thickness of about 3 microns.

The fibers were cut into lengths of about 15.2 centimeters and coated with boron nitride by the low pressure chemical vapor deposition process utilizing the reaction of $BCl_3$ and ammonia. The fibers were placed on a molybdenum screen which was placed in a quartz tube positioned at about the mid point of the hot zone in a tube furnace. The fibers were heated in vacuum to about 900° C., and a BN coating atmosphere comprised of nitrogen at about 400 milliliters per minute, $BCL_3$ at about 300 milliliters per minute, and ammonia at about 1000 milliliters per minute was passed through the quartz tube. The fibers were heated in the flowing atmosphere for about 2 hours to form a boron nitride coating about 4 microns thick.

Another group of fibers were coated with an inner layer of boron nitride, a carbon interlayer, and an outer layer of boron nitride. The fibers were heated in the BN coating atmosphere described above for about 75 minutes to form a two micron inner layer of boron nitride. The atmosphere was removed and purged with nitrogen. The furnace was then filled with acetylene for about 30 minutes to form a 500 angstrom coating of pyrolytic carbon. The acetylene was purged with nitrogen and the fibers were coated with an outer layer of about 2 microns of boron nitride as described above.

The coated fibers were aligned on a device comprised of a copper sheet etched to have parallel grooves about 152 microns wide, about 63 microns deep, and about 250 microns apart, center-to-center. The fibers were placed on the device so that a fiber was positioned in each groove to form a layer of uniformly spaced coated filaments. Adhesive tape was pressed onto the ends of the fiber layers forming layers about 15.2 by 15.2 centimeters of spaced fibers having a boron nitride coating, and layers of spaced fibers having a coating comprised of an inner layer of boron nitride, an interlayer of carbon, and an outer layer of boron nitride.

EXAMPLE 1

In Example 1, a fiber reinforced silicon carbide composite was formed with boron nitride coated fibers. A mixture was formed in a 500 cc. nalgene jar comprised of about 72 grams carbon fiber, about 18 grams silicon carbide powder, about 1.13 grams binder, about 75 grams of a 3:1 mixture of toluene and MIBK solvent, about 4 grams of a 1:1 solution by weight of epoxy resin and toluene, and about 0.6 grams of hardener. The mixture was vibration milled with about 700 grams of zirconia balls about 0.635 centimeter in diameter for about 5 minutes. About 3.48 grams of binder, about 0.375 grams DIDG plasticizer, about 3 grams of PVO plasticizer, and about 0.075 grams silicone oil were added to the mixture and subjected to 5 more minutes of vibrational milling. The mixture was roller milled for an additional 30 minutes, de-aired in a partial vacuum, and the mixing jar was back-filled with nitrogen.

Mylar tapes were positioned about 20 centimeters apart on a sheet of TEFLON, synthetic resin polymer, and the sheet was mounted on a glass plate. A number of layers of the boron nitride coated fibers were positioned on the sheet between the mylar tapes. An apparatus for forming tape by the conventional doctor blade tape casting method was positioned on the sheet, and the doctor blade adjusted to form tapes about 0.33 millimeter thick. The mixture was poured on the sheet, and the doctor blade was traversed across the sheet to spread the mixture between the mylar tapes, envelop the fibers, and form a green tape. Tapes were also formed by the method described above without a layer of fibers therein. The green tapes were allowed to dry in air to form tapes without fibers about 0.2 millimeter thick, and tapes with fibers about 0.28 millimeter thick.

The tapes had a first surface facing the TEFLON sheet, and a second oppositely facing surface. The tapes were removed from the sheet, cut into pieces about 15.2 by 15.2 centimeters, and coated with a solution comprised of about 10 grams of the binder in a solvent solution comprised of 50 grams of a first solution of a 1:1 mixture of toluene and epoxy, and 50 grams of a second solution of 39 grams toluene, 9.5 grams acetone, 39 grams xylene, and 9.5 grams ethanol. The coated pieces were stacked so that the fibers in each layer were extending in a direction normal to the adjacent layer to form a stack. In addition, two of the tapes formed without fibers were positioned at the bottom, and two at the top of the stack. This formed a stack having two layers without fibers at the top and bottom, five layers of tape with the fibers extending in a first direction, with each of the five separated by a layer of tape having the fibers extending normal to the first direction.

The stack was hot-pressed at about 100° C., and 50 psi between dyes covered with a TEFLON sheet for 10 minutes, 250 psi. for 15 minutes, and held at 15 psi. for about 3 hours to cure the epoxy and binder, and laminate the stack. Bar preforms having a width of about 1.27 centimeters and a length of about 15.2 centimeters were cut from the stack.

A rectangular hole about the size of the bar preform was cut in a carbon cloth. The bar preform was positioned in the hole and rectangular carbon blocks coated with boron nitride were positioned above and below the preform to form an infiltration assembly. A deposit about 2.7 times the weight of the preform and carbon cloth of a silicon alloy comprised of about 3 weight percent boron nitride was placed on the carbon cloth. The assembly was heated in a vacuum at about 50° C. per hour in a carbon furnace to about 550° C. to decompose the binder in the preform. The assembly was then heated at 180° C. per hour to 1425° C. and held for 15 minutes to infiltrate the preform, and react silicon with carbon to form a composite of coated silicon carbide fibers in a silicon carbide matrix. The composite was cooled at a rate of about 2° C. per minute to 1170° C. and furnace cooled to room temperature. The top and bottom surfaces of the composite were milled to leave a surface of silicon carbide of about 12.7 microns over the fiber layers adjacent the surfaces, leaving a final thickness of about 0.254 centimeters.

EXAMPLE 2

A silicon carbide composite was formed as described above in Example 1, however, the fiber reinforcement was the silicon carbide fibers having a coating with an inner layer of boron nitride, an interlayer of carbon, and an outer layer of boron nitride.

The composite bars formed in Example 1 and Example 2 were tested in tension, and a stress strain curve from the tension tests is shown in FIG. 1. FIG. 1 is a graph showing the tensile stress in kips per square inch on the ordinate, and the tensile strain in percent on the abscissa. Important tensile properties for composites are the amount of energy to fracture, i.e., the area under the tensile stress strain curve, the ultimate strength, and the strain to maximum stress of the test specimen. FIG. 1 shows that the strain to maximum stress has more than doubled for the composite bar formed in Example 2 as compared to the composite bar from Example 1. In addition, the ultimate strength, and amount of energy to fracture the specimen are both substantially increased in the composite bar formed in Example 2. Such improved properties for the composite formed in Example 2 shows that the fiber coating used to form the composite substantially improved protection of the reinforcement fibers during infiltration of the preform.

It should be noted that the matrix of the composites formed in Example 1 and 2 were comprised of about 20 volume percent of residual infiltrant that remained to fill porosity in the reaction formed silicon carbide matrix. A composite component formed as in Example 2, having a reactive inter layer in the protective coating on the reinforcement, will continue to provide improved protection to the reinforcement fiber from reaction with the residual infiltrant during use of the component at high temperatures, e.g. of about 1300° C. to 1500° C.

What is claimed is:

1. A composite comprised of a reinforcement phase in a matrix of molten silicon infiltration formed silicon carbide, the reinforcement phase having a protective coating comprised of an inner layer on the reinforcement phase, an interlayer on the inner layer, and an outer layer on the interlayer, the inner and outer layer being materials resistant to reaction with molten silicon, and the interlayer being a molten silicon reactive material which forms compounds having a melting temperature higher than silicon.

2. The composite of claim 2 wherein the inner and outer layer material is at least one of a metal carbide in which the metal is titanium, hafnium, zirconium, or tantalum; a metal nitride in which the metal is silicon, aluminum, titanium, zirconium, hafnium, niobium, or tantalum; or a metal boride in which the metal is titanium, zirconium, hafnium, silicon, or aluminum.

3. The composite of claim 1 wherein the inner layer material is a metal oxide in which the metal is aluminum, yttrium, titanium, zirconium, hafnium, beryllium, silicon, lanthanum, scandium or the rare earths; and the outer layer material is at least one of rhodium, iridium, a metal carbide in which the metal is titanium, hafnium, zirconium, or tantalum, a metal nitride in which the metal is silicon, aluminum, titanium, zirconium, hafnium, niobium, or tantalum, or a metal boride in which the metal is titanium, zirconium, hafnium, silicon, or aluminum.

4. The composite of claim 2 wherein the molten silicon reactive material is at least one layer of carbon, molybdenum, titanium, chromium, niobium, zirconium, or iridium.

5. The composite of claim 3 wherein the molten silicon reactive material is at least one layer of carbon, molybdenum, titanium, chromium, niobium, zirconium, or iridium.

6. A composite according to claim 1 wherein the inner and outer layer material is at least one of boron nitride or silicon nitride, and the molten silicon reactive material is at least one layer of carbon, molybdenum, titanium, chromium, niobium, zirconium, or iridium.

7. A composite according to claim 1 wherein the inner and outer layer material is at least one of boron nitride or silicon nitride, and the molten silicon reactive material is carbon.

8. A composite according to claim 4 wherein the reinforcement phase is a fiber of carbon or silicon carbide.

9. A composite according to claim 5 wherein the reinforcement phase is a fiber of carbon or silicon carbide.

* * * * *